(12) United States Patent
Zhang et al.

(10) Patent No.: US 9,276,254 B2
(45) Date of Patent: Mar. 1, 2016

(54) METHOD FOR REMOVING BURRS OF BATTERY ELECTRODE PLATES BY INDUCTIVELY COUPLED PLASMA DRY ETCHING

(71) Applicant: NANJING UNIVERSITY, Nanjing, Jiangsu (CN)

(72) Inventors: Rong Zhang, Jiangsu (CN); Ting Zhi, Jiangsu (CN); Tao Tao, Jiangsu (CN); Zhili Xie, Jiangsu (CN); Zhiguo Yu, Jiangsu (CN); Bing Liu, Jiangsu (CN); Peng Chen, Jiangsu (CN); Xiangqian Xiu, Jiangsu (CN); Yi Li, Jiangsu (CN); Ping Han, Jiangsu (CN); Yi Shi, Jiangsu (CN); Youdou Zheng, Jiangsu (CN)

(73) Assignee: NANJING UNIVERSITY, Nanjing, Jiangsu (CN)

( * ) Notice: Subject to any disclaimer, the term of this patent is extended or adjusted under 35 U.S.C. 154(b) by 166 days.

(21) Appl. No.: 13/855,625

(22) Filed: Apr. 2, 2013

(65) Prior Publication Data
US 2014/0042121 A1 Feb. 13, 2014

(30) Foreign Application Priority Data
Aug. 13, 2012 (CN) .......................... 2012 1 0287527

(51) Int. Cl.
*H01B 13/00* (2006.01)
*H01M 4/04* (2006.01)
*H01M 10/04* (2006.01)
*H01M 10/0587* (2010.01)
*H01M 10/42* (2006.01)

(52) U.S. Cl.
CPC .............. *H01M 4/0471* (2013.01); *H01M 4/04* (2013.01); *H01M 10/0431* (2013.01); *H01M 10/0436* (2013.01); *H01M 10/0587* (2013.01); *H01M 10/42* (2013.01)

(58) Field of Classification Search
None
See application file for complete search history.

(56) References Cited

U.S. PATENT DOCUMENTS

2004/0202928 A1* 10/2004 Miyamoto et al. ............ 429/137
2010/0035151 A1* 2/2010 Takahashi ..................... 429/210

OTHER PUBLICATIONS

Derwent, 2010-K68220, 2010, Derwent, 5 pages total.*
Rack, Plasma Etching Outline, Mar. 1, 2003, University of Tennessee, Terminology table, Why Plasma Etching Table, Wet Etching Characteristics table.*
Crockett et al, Plasma Delayering of Integrated Circuits, Trion Technology, Feb. 1, 2001, 9 pages and date stamp.*
Quirk et al, Semiconductor Manufacturing Technology, 2001, Prentice Hall, Chapter 16, Table 16.4, Table 16.21, Table 16.6, Table 16.25.*
Chen, Wet and Dry Etching, Apr. 12, 2004, Harvard, p. 1.*

* cited by examiner

*Primary Examiner* — Binh X Tran
*Assistant Examiner* — David Cathey, Jr.
(74) *Attorney, Agent, or Firm* — Tianhua Gu; Global IP Services

(57) ABSTRACT

The present invention provides a method for removing burrs of battery electrode plates using inductively coupled plasma (ICP) dry etching, in which an induction coil is used for ionizing reaction gas. A DC bias is applied to accelerate the ionized reaction gas to bombard the burrs of electrode plate, removing burrs that formed in machining processes using physical bombardment. The equipment used in the present invention is an ICP etch system. The method according to the present invention can completely remove the burrs of electrode plate, thereby effectively preventing short circuits caused by burrs penetrating the membrane separator in the battery.

2 Claims, 2 Drawing Sheets

METHOD FOR REMOVING BURRS OF BATTERY ELECTRODE PLATES BY INDUCTIVELY COUPLED PLASMA DRY ETCHING

CROSS REFERENCE TO RELATED PATENT APPLICATION

The present application claims the priority of Chinese patent application No. 2012102875278 filed on Aug. 13, 2012.

FIELD OF THE INVENTION

The present invention relates to a method for etching burrs of battery electrode plates, particularly a method for dry etching burrs of battery electrodes using inductively coupled plasma (ICP).

BACKGROUND INFORMATION

In recent years, with the widespread use of mobile devices such as laptop computers, smart phones, cameras and other portable electronics, the need for high energy-density batteries becomes increasingly important.

In the present technology, a battery comprises a positive electrode plate, a negative electrode plate, electrolyte, and two membrane separators for preventing electronic contact of the electrodes. In the machining process, it is easy to form burrs on the electrode plates. It is probable that the burrs penetrate the membrane separator when the battery elements are wrapped and stacked and this gives rise to an internal short circuit. The burrs generated on the edge of the battery case may also come off to cause an external short circuit between the battery case and the lid (sealing plate), thereby causing a voltage drop. Therefore, the electrode burrs greatly affect the quality and performance of batteries.

To date, several methods have been proposed to deburr the electrodes using chemical or mechanical methods. Wang et al. described in their patent a method for removing burrs of electrode plates by passing the electrode plates through rotating rolls on a conveyer belt to flatten the burrs. This technique essentially applies suitable pressure on the edge of electrode plates to virtually eliminate burrs. However, this mechanical method only blunts the burrs without completely eliminating them, so it has many limits in removing the burrs resulted from the cutting of battery electrode plates.

Guo et al. described another technique which employs a chemical reaction of alkaline substance with aluminum to remove the burrs of the negative electrode plate. However, this chemical method has a serious corrosion effect as part of the surface of the electrode is etched. The small burrs cannot be completely eliminated. Also, when coiled material is processed using this method, undesirable contamination may take place due to capillary action, degrading the quality of batteries.

ICP dry etching is a method in which material is etched by ion bombardment and reaction with reactive gas in the plasma. This method has excellent anisotropy, convenient operation, low cost and high etching rate.

SUMMARY OF THE INVENTION

The present invention relates to a method for removing burrs of electrode plates, specifically using inductively coupled plasma to etch metal burrs. Plasma is directed and accelerated by an inductive magnetic field. Plasma bombards the surface of battery electrode plates, knocking away metal atoms that form the burrs. In addition, accompanied by ion bombardment, the chemical reaction between the reactive gas and the metal burrs on the edge of battery electrode plates is accelerated.

The method according to the present invention is a dry etching method to remove burrs of battery electrode plates using ICP, where a magnetic field is generated by an induction coil. The metal burrs are etched by physical bombardment of the ionized gas driven by a DC bias. Also, the present innovation has the advantage of etching burrs in targeted areas of coiled structures with controlled time.

The method according to the present invention removes burrs of electrode plates in an ICP etch system. Electrode plates are placed into the etch zone under the plasma source. Reaction gas is ionized in the magnetic field generated using an induction coil. Ionized gas is charged and more chemically reactive. The speed and direction of the reaction gas is controlled by a DC bias, which is applied between the source of reaction gas and the etch zone. The present invention utilizes accelerated plasma to bombard the burrs on the electrode. Meanwhile, excited, ionized gas can react with metal. The burrs are more chemically reactive compared to oxide-covered metal surface of the electrode, therefore chemical reaction removes the burrs first while the rest of the electrode surface remains intact.

According to the present invention, process parameters such as bias power, gas pressure, and etch time may be adjusted based on the material of the electrode plate. The material includes, but is not limited to, most metals such as aluminum, iron and gold, semiconductors such as gallium nitride and gallium nitride, and dielectric material such as silicon oxide and silicon nitride, etc. The etch depth using ICP can be 0.1 mm-3 mm. These process parameters are set as follows:

Chamber pressure: 5-15 Pa, ICP power: 80-250 W, DC bias: 5-750 V, plasma frequency: 13-14 MHz, flow ratio of chlorine to boron trichloride 8:1, etch time: 1-10 minutes.

The present invention provides a method for completely removing burrs of electrode plates. Compared to current technology, the method according to the present invention is more efficient than the mechanical method, which only blunts the burrs. The etching process in the present invention does not corrode the electrode surface as in the chemical method, thereby preventing short circuits caused by burrs penetrating the separator without affecting battery performance.

DETAILED DESCRIPTION OF THE INVENTION

Figure 1:
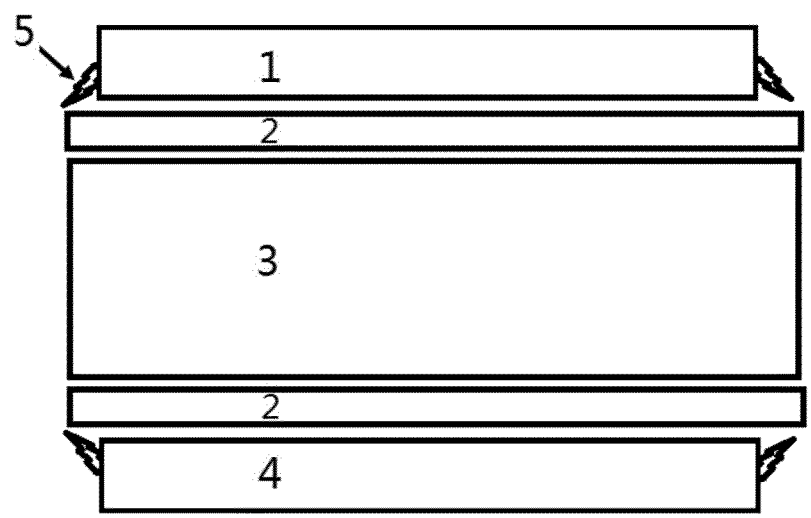
FIG. 1 is a schematic drawing of a battery according to the present technology.

Burrs usually occur when machining metal electrodes, especially during cutting, blanking, and milling. A schematic of electrode burrs 5 is shown in FIG. 1. A battery comprises a positive electrode plate 1, a negative electrode plate 4, electrolyte 3, and two membrane separators 2 for preventing electronic contact of the electrodes. If burrs 5 penetrate the membrane separator 2 when the battery elements are wrapped and stacked, this gives rise to an internal short circuit. In order to prevent this, a process of removing the electrode burrs 5 (any unwanted thin wire or raised portion on the electrode surface) is necessary.

Figure 2:
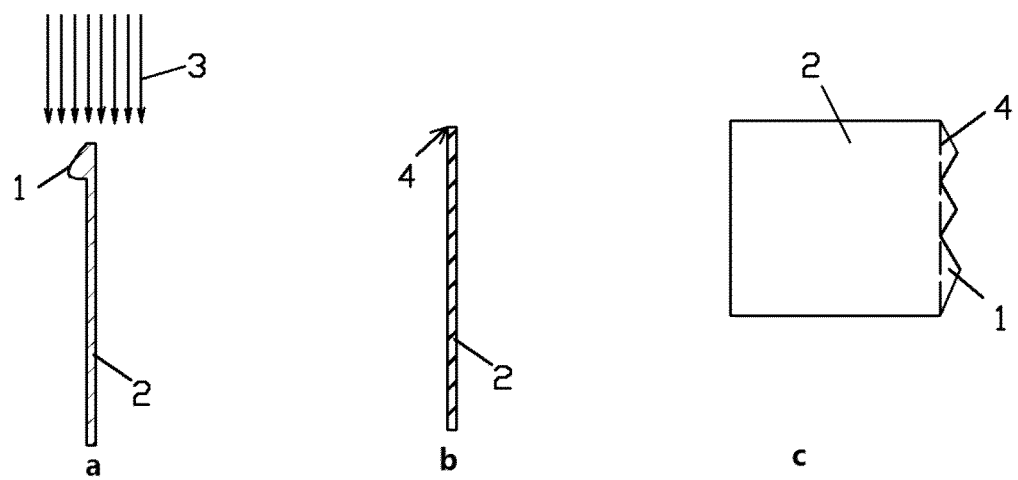
FIG. 2*a* illustrates ions bombarding the edge of the electrode plate.
FIG. 2*b* illustrates the electrode plate after dry etching.
FIG. 2*c* presents a view of the electrode plate with burrs as seen from the edge of the electrode plate.

According to the present invention, the electrode is processed in an ICP etching system. Process parameters for etching have to be chosen based on the material and thickness of the electrode. The electrode plate is placed on the sample platter of the ICP etching system. Once chamber pressure is stabilized, reaction gas is ionized. The ionized plasma 3 bombards the electrode plate from the vertical direction, i.e. parallel to the plate, thereby removing the burrs 1 without affecting the rest of the plate (FIG. 2a). In addition, the plasma chemically reacts with the surface of the electrode plate. Since the burrs are more chemically reactive compared to oxide-covered metal surface of the electrode, the chemical reaction removes the burrs while the rest of the electrode surface remains intact.

Figure 3:
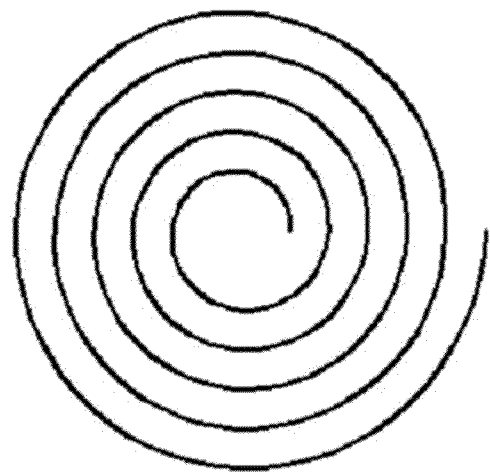
FIG. 3 is a side view of the coiled structure to be deburred

FIG. 3 provides a side view of an electrode to be debarred. This electrode is a coiled metal foil, which is placed vertically on the sample platter of the ICP etch system. Ionized reaction gas bombards the edge of the electrode, eliminating burrs. This embodiment only provides one way of placing the electrode plate on the sample platter; in practice, there are a number of ways to place samples as long as the pointing direction of the burrs is perpendicular to the direction of plasma bombardment.

Figure 4:
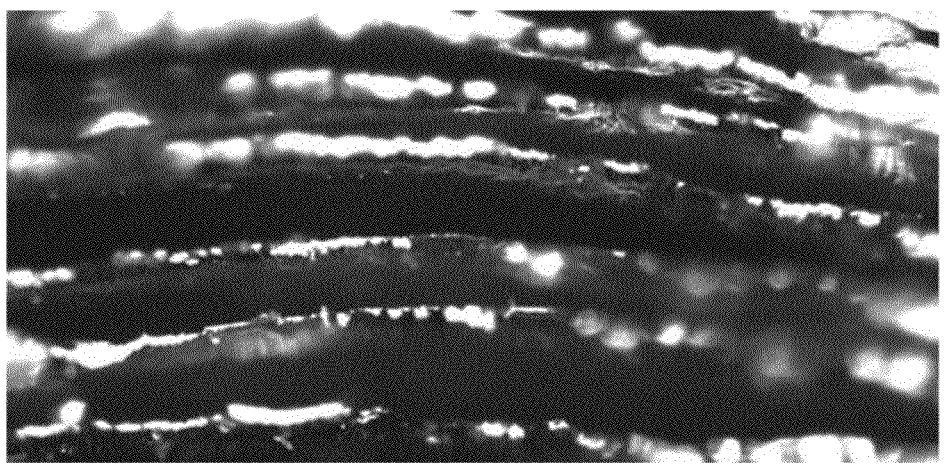
FIG. 4 is a microscope image of coiled electrode plate with burrs
Figure 5:
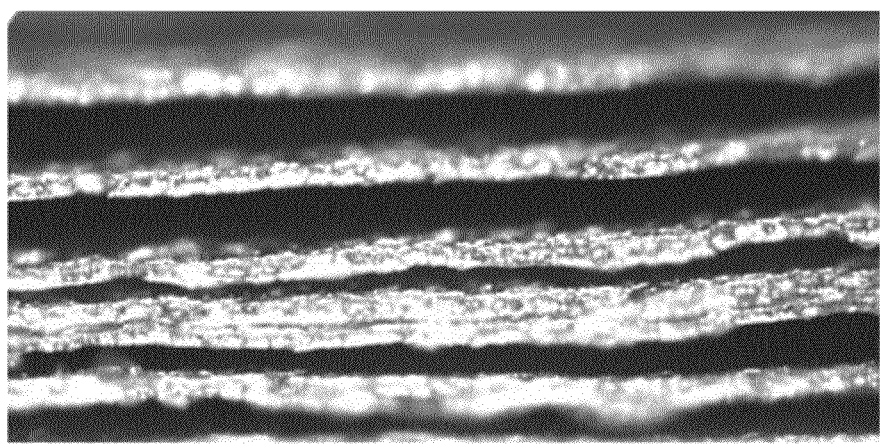
FIG. 5 is a microscope image of coiled electrode plate after dry etching.

FIG. 4 and FIG. 5 are optical microscope images of a coiled aluminum foil with burrs before and after etching. In this example, the thickness of the aluminum foil was 0.1 mm. The foil was rolled into a cylinder shape, and placed on the sample platter vertically to ensure that the pointing direction of the burrs is perpendicular to the direction of plasma bombardment. The process parameters are as follows:
Chamber pressure: 10±0.5 Pa, ICP power: 150±2 W, DC bias: 70±5 V, plasma frequency: 13 MHz, flow ratio of chlorine to boron trichloride: 8:1; etch time: 3±0.5 min. The ICP etch system used in the present invention: Oxford Instrument Plasmalab System 100.

The process parameters listed above were used specifically for the 0.1 mm thick aluminum foil. They are not intended to limit the scope of the present invention. The parameters need to be adjusted based on the material and thickness of the electrode for best results.

The present invention provides a method to effectively remove burrs of electrode plates. This method is easy to operate, efficient, and ensures the quality of batteries subsequently manufactured using the processed electrode.

What is claimed is:

1. A method for using inductively coupled plasma dry (ICP) etching to remove burrs of battery electrode plate comprising:
   step 1, preparing ICP etch system which includes an induction coil used for ionizing reaction gas and a sample platter;
   step 2, setting etching process parameters according to the material and thickness of the battery electrode plate, the process parameters are selected within a range comprising:
   chamber pressure 5-15 Pa, ICP power 80-250 W, DC bias 5-750 V, plasma frequency 13-14 MHz, flow ratio of chlorine to boron trichloride 8:1, etch time 1-10 minutes;
   step 3, putting the battery electrode plate with coiled metal foil on the sample platter vertically to exposure burrs to the ionized reaction gas;
   step 4, an applied DC bias accelerates the ionized reaction gas to bombard the burrs of the battery electrode plate, to remove the burrs;
   the battery electrode plate consisting of aluminum, iron, gold, silicon oxide, silicon nitride and semiconductors; and
   the battery electrode plate is 0.1 mm-3 mm thickness.

2. The method according to claim 1, wherein an aluminum battery electrode plate with 0.1 mm thickness is etched by using following process parameters: chamber pressure 10±0.5 Pa, ICP power 150±2 W, DC bias: 70±5 V, plasma frequency 13 MHz, flow ratio of chlorine to boron trichloride 8:1; etch time 3±0.5 min.

* * * * *